United States Patent
Tominari et al.

[11] Patent Number: 5,833,848
[45] Date of Patent: Nov. 10, 1998

[54] FILTER FOR HIGH-VISCOSITY FLUIDS

[75] Inventors: Kenichi Tominari, Narashino; Akio Kanezawa, Sodegaura; Yasujiro Shigeta, Chiba; Eiji Tada, Ichihara, all of Japan

[73] Assignee: General Electric Company, Pittsfield, Mass.

[21] Appl. No.: 602,142

[22] Filed: Feb. 15, 1996

[30] Foreign Application Priority Data

Feb. 21, 1995 [JP] Japan ................................ 7-057956

[51] Int. Cl.⁶ ........................... B01D 35/12; B29C 47/68
[52] U.S. Cl. .................. 210/232; 210/236; 425/197; 425/199
[58] Field of Search .................... 425/183, 197, 425/198, 199; 210/232, 236, 238, 186

[56] References Cited

U.S. PATENT DOCUMENTS

| | | |
|---|---|---|
| 2,867,325 | 1/1959 | Hirs . |
| 3,084,800 | 4/1963 | Baxter . |
| 3,672,507 | 6/1972 | Paull, Jr. . |
| 4,318,677 | 3/1982 | Ullrich . |
| 4,728,279 | 3/1988 | Bellmer . |
| 4,762,615 | 8/1988 | Drori . |

FOREIGN PATENT DOCUMENTS

| | | |
|---|---|---|
| 2297068 | 11/1973 | France . |
| 2457117 | 12/1980 | France . |
| A-2 457 117 | 12/1980 | France . |
| 2460699 | 1/1981 | France . |
| A-2 460 699 | 1/1981 | France . |
| 3242286 | 5/1984 | Germany . |
| 54-014465 | 2/1979 | Japan . |
| A 1-97010 | 5/1986 | Japan . |
| 4175368 | 6/1992 | Japan . |
| 4249569 | 9/1992 | Japan . |
| 5097742 | 4/1993 | Japan . |
| 6025045 | 2/1994 | Japan . |
| 1058530 | 11/1965 | United Kingdom . |
| WO 93/19830 | 10/1993 | WIPO . |

*Primary Examiner*—Thomas M. Lithgow

[57] ABSTRACT

A filter for high-viscosity fluids can be used in small to large-sized units, shows no thermal deterioration of the contents, and allows simple, rapid, and safe exchanging of the filter units and has a structure in which at least one filter element is built in, such that when a filter unit having an inlet opening and an outlet opening has the aforementioned inlet opening attached to the outlet opening of the unit on the upstream side and the aforementioned outlet opening attached to the inlet opening of the unit on the downstream side, two supporting plates, one fixed and one movable, are attached to an inlet-side adapter and an outlet-side adapter, the aforementioned filter unit is surrounded by said fixed supporting plate and movable supporting plate, and by moving the movable supporting plate, the various connecting parts can be closed and opened.

8 Claims, 2 Drawing Sheets

Fig. 2
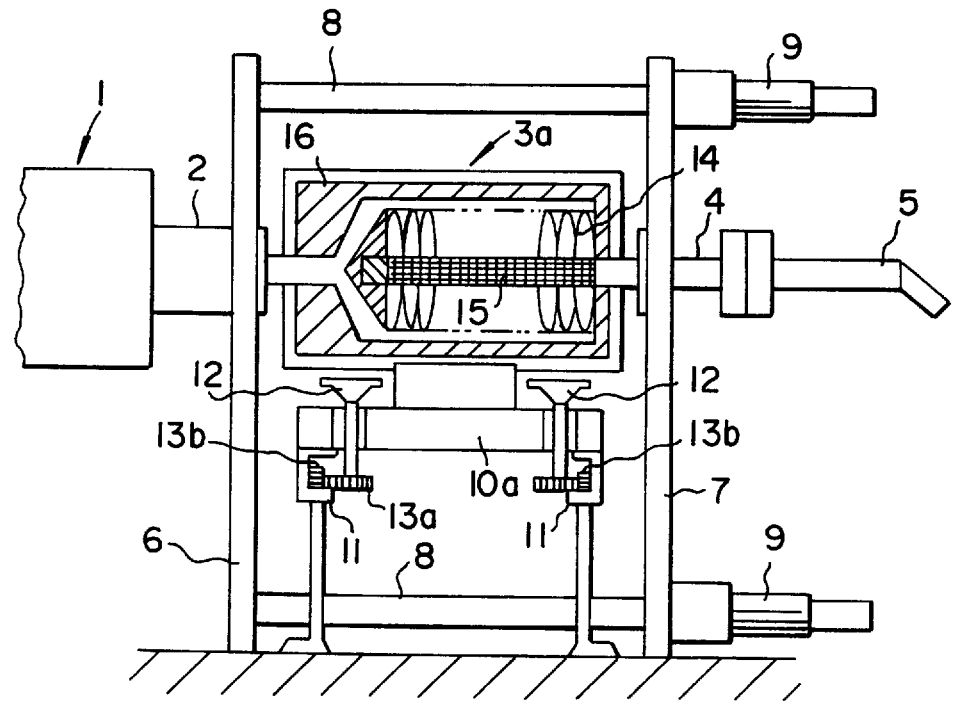
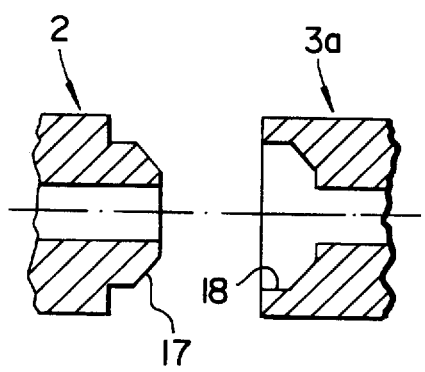
Fig. 3(A)
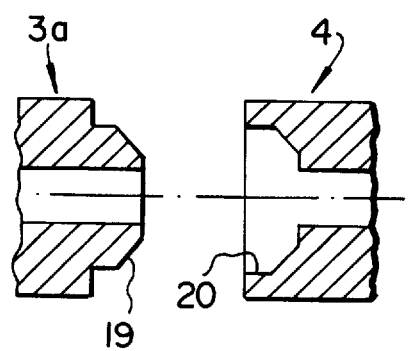
Fig. 3(B)

FILTER FOR HIGH-VISCOSITY FLUIDS

The present invention relates to a filter for high-viscosity fluids, particularly to a filter for molten thermoplastic resins, and more specifically, to a filter which supports a filter unit for intermediate or final filtering of high-viscosity molten resins in polymerization plants or filter units used in various plastic molding devices, and which can be exchanged.

Examples of the aforementioned plastic molding devices include, in addition to granulation devices having various die types and molding devices for applications such as extrusion molding, film molding, and sheet molding, fiber molding devices of types such as the molten, dry, wet, and semidry type.

In the process of manufacturing or molding thermoplastic resins, various filters are used to remove impurities in the molten polymer. In particular, removal of impurities, gel, etc., is of vital importance in resins to be used in applications requiring transparency, such as optical applications and fiber applications.

Filters used for this purpose must show improved accuracy of filtration, and a variety of types, ranging from simple metal mesh filters made of woven wire to high-precision filter units of the candle type or disk type combining metal non-woven fabric and sintered metal, have come into use.

However, in facilities using such filter units, once operations have been shut down, the filter portion tends to constitute a source of impurities, and after operations are resumed, numerous defective products are produced, and the working ratio of the facility drops. Accordingly, it is important to find ways to ensure that operation will be as continuous as possible.

For this reason, devices have been developed which allow the exchanging of filter units for this type of facility to be carried out during continuous operation.

Moreover, in cases where the aforementioned high-temperature, high-viscosity fluid is a molten thermoplastic resin, when the fluid becomes stuck, thermal deterioration of the resin occurs, resulting in contamination. At the same time, the occurrence of such contaminated products is a factor which reduces filter life, and it is therefore necessary to reduce dead space as much as possible.

In order to meet these requirements, units have been proposed in which double (multiple) filters are used, the channel can be switched using direction-switching valves installed on the inlet side and outlet side, and connection is carried out using circular tubes (Japanese Laid-Open Patent No. 72-8345), as well as units in which the filter can be continuously switched using a spool valve (Japanese Laid-Open Patent No. 73-34946).

However, because the channel structure of these devices is complex, it becomes impossible to eliminate dead space, so there is no way to avoid deterioration of the products. Moreover, as the channel is long, fluid passing through deteriorates as a result of lengthy heating times, and it therefore tends to undergo deterioration and discoloration. Moreover, there are disadvantages such as the fact that the sliding parts of the valve become immobile due to stickiness of the fluid. The larger the equipment is, the more pronounced these tendencies become, making application in large-scale facilities practically impossible.

Moreover, many devices have also been proposed in which, instead of switching the channel, multiple filters are attached to a movable slide plate, and the filter can be exchanged by moving this slide plate (Japanese Laid-Open Patents Nos. 76-10381 through 10383, 79-14465, 80-101437, and 87-87319).

These devices are used in extruders ranging from small to large size. However, as presented in the above-mentioned Japanese Laid-Open Patent Application No. 76-10381, the filtering area of the filter can only be as large as the cross-sectional area of the extruder cylinder at the most. There are also examples of units in which multiple candle-type filters are used, but there are mechanical or economic restrictions on increasing the filtering area imposed by the dimensions of the slide blade, the structure of the supporting unit, etc.

As the absolute filtering accuracy required in applications such as high-grade molten resins in particular is 100 $\mu$m or less, it is virtually impossible to use multiple candle-shaped or leaf disk-shaped filter elements. Furthermore, as sealing of the slide surface is insufficient, leakage of the contents frequently occurs.

For the above reasons, in the process of manufacturing thermoplastic resins to be used in various optical and fiber applications, etc., use of multiple series of the aforementioned filter switching units is impractical.

Furthermore, in large-scale facilities, dangerous operations in which the extruder is shut down for long periods and personnel must exchange high-temperature filter units under time pressure cannot be avoided. While such operations are being carried out, thermal deterioration of the contents occurs, requiring cleaning operations for long periods even after the unit is put back into operation, thus causing a decrease in yield.

The present invention may be applied in small- to large-sized filter units in filters for high-viscosity fluids composed of high-performance filter elements having an absolute filtering accuracy of 100 $\mu$m to 1 $\mu$m or less, and its purpose is to provide a filter in which thermal deterioration of the contents is prevented due to the absence of dead space inside the filter, and the filter units may be simply, rapidly, and safely exchanged without essentially shutting down operations.

The present invention solves these problems by comprising a filter having a structure in which at least one filter element is built in, such that when a filter unit having an inlet opening and an outlet opening has the aforementioned inlet opening attached to the outlet opening of the unit on the upstream side and the aforementioned outlet opening attached to the inlet opening of the unit on the downstream side, two supporting plates, one fixed and one movable, are attached to an inlet-side adapter and an outlet-side adapter, the aforementioned filter unit is surrounded by said fixed supporting plate and movable supporting plate, and by moving the movable supporting plate, the various connecting parts can be closed and opened.

Moreover, the present invention may comprise a filter in which the aforementioned movable plate and fixed plate are connected by a tie bar, the aforementioned filter unit is surrounded by said movable plate and fixed plate, and the connecting parts can be closed and opened by moving the aforementioned movable plate.

BREIF DESCRIPTION OF THE DRAWINGS

FIG. 2 is a front view showing the filter for high-viscosity fluids of FIG. 1.

FIG. 3a and 3b are sectional diagrams showing an example of the connecting parts connecting the outlet opening of the filter unit and the adapter.

Figure 1:
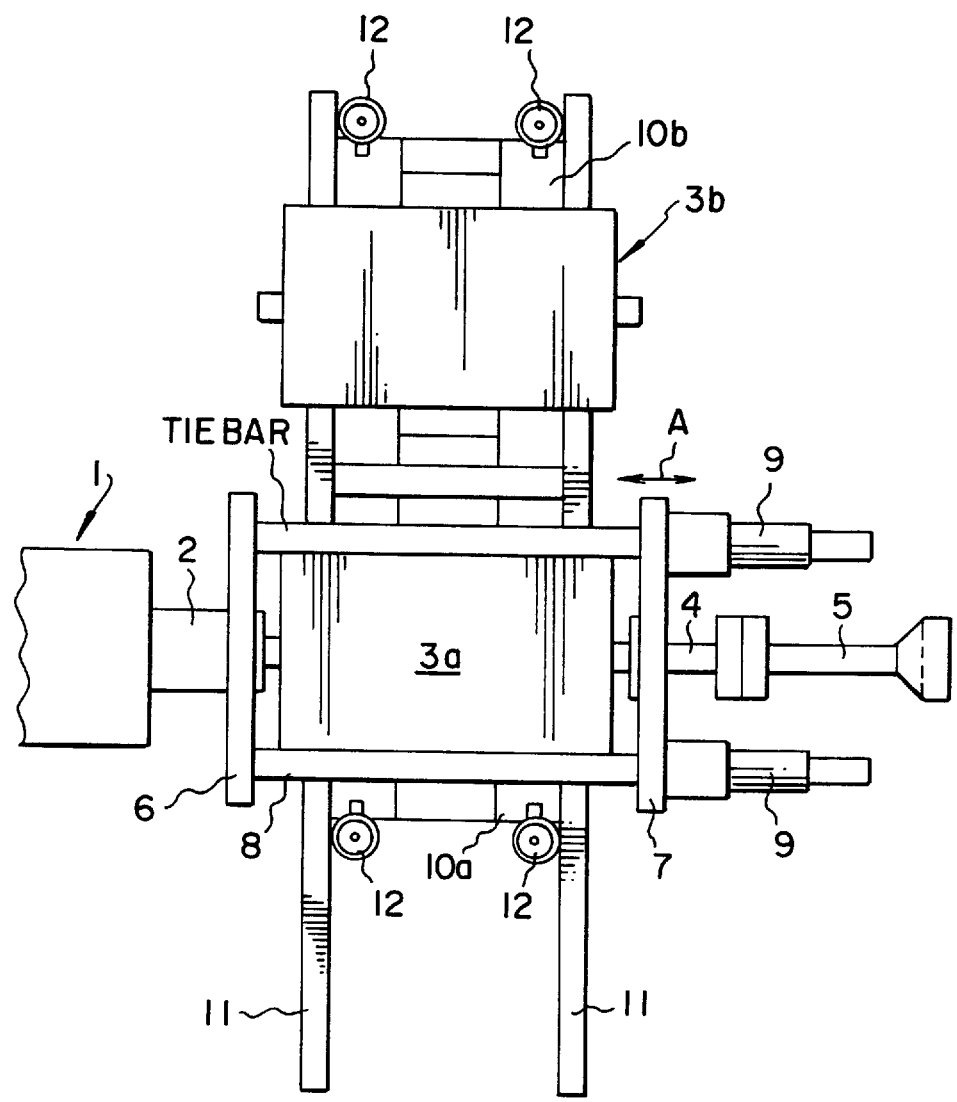
FIG. 1 is a plan diagram showing the filter for high-viscosity fluids of the invention.

In the filter for high-viscosity fluids of the present invention, a filter unit is placed between an upstream-side unit such as an extruder for molten resin and a downstream-side unit such as a die plate for granulation, and sealing between the upstream and downstream-side units is carried out using a driver of the hydraulic cylinder type, etc. After its impurities have been removed, the molten resin which flows from the upstream-side unit to the filter unit is supplied to the downstream-side unit.

The above-mentioned upstream-side unit, filter unit, and downstream-side unit are connected by extremely short straight tubing, and there are no complex mechanisms such as curves or valves inside the channel. Accordingly, there is no unwanted dead space, and thermal decomposition of the contents, particularly molten resin, is virtually absent.

In this case, the filter unit is supported by a supporting base, and this base is installed using a guide rail or bottom casters, etc., making it possible to exchange the filter unit.

The following is an explanation of the present invention by means of examples referring to the attached figures. FIG. 1 is a plan view, and FIG. 2 is a front view. In this case, the upstream-side unit is an extruder for thermoplastic resin, and the downstream-side unit is a die plate for granulation used for molding of molten resin into pellets of specified dimensions and shape. However, it may also be applied in other types of units through which high-viscosity fluids flow.

The inlet opening of the filter unit 3a is connected to the outlet opening of the extruder 1 via an adapter 2, and the outlet opening of this filter unit is connected to a die 5 via an adapter 4. The extruder-side adapter 2 and the fixed supporting plate 6 form a continuous unit, and the adapter 4 on the die side 5 and the movable supporting plate 7 also form a continuous unit.

The fixed supporting plate 6 and the movable supporting plate 7 are mutually connected by the tie bar 8. Moreover, this movable plate 7 may be moved in the axial direction indicated in the figure by the double-headed arrow A by the action of multiple operating cylinders 9.

The first filter unit 3a which is currently in use and the second filter unit 3b which is to be used as a replacement are installed on supporting bases 10a and 10b respectively. Moreover, the filter units 3a and 3b may be removed from the supporting bases 10a and 10b.

Furthermore, the supporting bases 10a and 10b are installed so as to be capable of upward and downward movement along the guide rail 11 as shown in FIG. 1. The movement mechanism in this case may have a variety of different compositions. For example, as shown in FIG. 2, this may be carried out by means of the relative movement between a gear wheel 13a attached to a control wheel 12 and a toothed rail 13b attached to the guide rail 11.

The filter unit 3a, together with both the upstream and downstream adapters 2 and 4, is tightened and sealed by means of the fixed supporting plate 6 and the movable supporting plate 7.

The extruder 1, which is the upstream-side unit, is connected to the filter unit 3a via adapter 2, and the die 5, which is the downstream-side unit, is connected to said filter unit via adapter 4.

FIGS. 3 (A) and (B) show an example of connecting parts between the various adapters and filters. In this practical example, the upstream side of the high-viscosity fluid is composed of male connecting pieces 17 and 19, and the downstream side is composed of female connecting pieces 18 and 20. These connecting pieces can be brought together by applying pressure to the movable supporting plate using the operating cylinder 9.

As shown in FIG. 2, when the two filter units 3a and 3b are equipped with a heating jacket which can be heated using an electrical, steam, or fluid heating element, etc., heating of the contents can be conveniently carried out.

In the upstream-side extruder 1, melt-kneaded fluid resin is supplied to the filter unit 3a via adapter 2, and it is filtered by a multiple-sheet leaf disk-type filter element 14 installed inside the unit. After the impurities have been removed, the molten fluid resin flows through the pores on the surface of a porous tube 15 into the inside of the tube, and it is then supplied from adapter 4 to the die, which is the downstream-side unit. After the resin, which is extruded from the die 5 in a strand shape, is cooled and hardened by a commonly-known method, it can be cut into resin pellets having the desired dimensions.

Moreover, the replacement filter 3b is mounted on the supporting base 10b, ready for use, where it is warmed by residual heat.

When the differential pressure in the filter unit 3a in current use increases and it is time to change the filter, the extruder 1 is first shut down. Next, by actuating the operating cylinder 9, the movable plate 7 is moved in the direction of the die 5 (to the right in the figure), and the filter unit 3a is separated from the adapters 2 and 4 above and below.

Under these conditions, when the control wheel 12 is actuated, causing the cogwheel 13a to turn, the filter unit 3a is caused to move by the toothed rail 13b along the guide rail 11 (downward in FIG. 1, toward the viewer in FIG. 2).

Next, the replacement filter unit 3b is moved along the guide rail 11 in the same manner, causing the connecting parts of the two adapters 2 and 4 and the inlet and outlet openings of the filter 3b to be brought into line.

After this, the operating cylinder 9 is used to cause the movable supporting plate 7 to move to the left as shown in the figure, causing sealing to occur between the filter unit 3b and the various connecting parts of the adapters 2 and 4. Next, the upstream-side unit, or the extruder 1 in this case, is put back into operation. The time for which the extruder must be shut down during this exchange operation can be held down to approximately 5–15 minutes.

The removed filter unit 3a is removed from the supporting base 10a, and cleaning and replacement of the required components, etc., is carried out. After consolidation of cleaning and exchanging, etc., has been completed, the filter unit 3a is mounted on the supporting base 10a, and it becomes the replacement filter to be used the next time.

In the filter for high-viscosity fluids of the present invention, as a high-precision filter having no dead space is used, no impurities are produced. Moreover, restrictions on the number of filter elements to be installed can be eliminated. Accordingly, limitations on the filtering area per unit volume of fluid passing through can be alleviated, making it possible to mass-produce high-quality resins containing negligible amounts of impurities.

Moreover, the time required to exchange the filter unit can be considerably reduced compared to units using conventional technology, and decreases in product quality caused by thermal deterioration, etc., of the fluid resin due to operational shutdowns can be prevented.

We claim:

1. A rapid change filter system comprising a filter element having an inlet opening and an outlet opening wherein the inlet opening is connected via an inlet-side adapter to an outlet opening of an upstream unit on the upstream side and the outlet opening is connected via an outlet-side adapter to an inlet opening of a downstream unit on the downstream side, two supporting plates, one fixed and one movable, which are attached to the inlet-side adapter and the outlet-side adapter, wherein the filter element is surrounded and sealed by said fixed supporting plate and said movable supporting plate, and by moving the movable supporting plate, the openings are closed and opened, a replacement filter element, a guide rail and means for moving said replacement filter element along said guide rail whereby said replacement filter element replaces said filter element.

2. The filter of claim 1, wherein the fixed supporting plate and movable supporting plate are connected by a tie bar.

3. The filter of claim 1 wherein the filter element is composed of multiple candle-shaped or leaf disk-shaped filter elements.

4. The filter of claim 1 having a driver for moving the movable plate which is a driver having either a hydraulic, pneumatic, or mechanical operating cylinder.

5. The filter of claim 1 wherein the downstream unit is a molding die.

6. The filter of claim 1 wherein the upstream unit is a thermoplastic resin extruder.

7. The filter of claim 1 wherein the upstream unit is a gear pump.

8. The filter of claim 1 wherein the filter element is replaced by said replacement filter element by means of casters on a supporting base for each of the elements.

* * * * *